United States Patent [19]
Beaty

[11] 4,187,754
[45] Feb. 12, 1980

[54] NOISE DAMPENED ROTARY SAW BLADE

[76] Inventor: Loma B. Beaty, 113 NW. First St., Fort Payne, Ala. 35967

[21] Appl. No.: 944,310

[22] Filed: Sep. 21, 1978

[51] Int. Cl.$^2$ .......................................... B27B 33/08
[52] U.S. Cl. .................. 83/847; 51/206 R; 83/676; 83/835; 144/218
[58] Field of Search .......................... 83/835, 847, 676; 51/206 R; 144/218

[56] References Cited

U.S. PATENT DOCUMENTS

| | | | |
|---|---|---|---|
| 3,675,526 | 7/1972 | Bush | 83/835 X |
| 3,799,025 | 3/1974 | Tsunoda | 83/835 |
| 3,812,755 | 5/1974 | Danielsen | 83/835 |
| 3,990,338 | 11/1976 | Wikner et al. | 83/835 |
| 4,106,382 | 8/1978 | Salje et al. | 83/835 |

*Primary Examiner*—Frank T. Yost
*Attorney, Agent, or Firm*—Clarence A. O'Brien; Harvey B. Jacobson

[57] ABSTRACT

A vibration damped rotary disk is provided and includes a pair of circular disk panels disposed in side-by-side superposed relation. The panels include shallow concentric and opposing annular recesses formed therein of a radial extent greater than one-half the radial extent of the panels and spaced inwardly of the outer marginal portions of the panels. A filler of mechanical vibration dampening and absorbing material is disposed in and fills the recesses and the outer marginal portions of the disk panels disposed outwardly of the recesses are secured together. Preferably, circumferentially spaced rivets are utilized to secure the outer marginal portions of the disk panels together and those opposing surfaces of the disk panels disposed radially outwardly and radially inwardly of the recesses have a thin layer of Teflon interposed therebetween, the disk panels being constructed of metal. The opposing inner surfaces of the recesses may be finely or coarsely roughened, to provide intimate stabilization of the filler material relative to the disk panels. Such roughening may be in the form of fine concentric circular grooves formed in the recess inner surfaces or by more coarse texturing of the recess inner surfaces.

12 Claims, 11 Drawing Figures

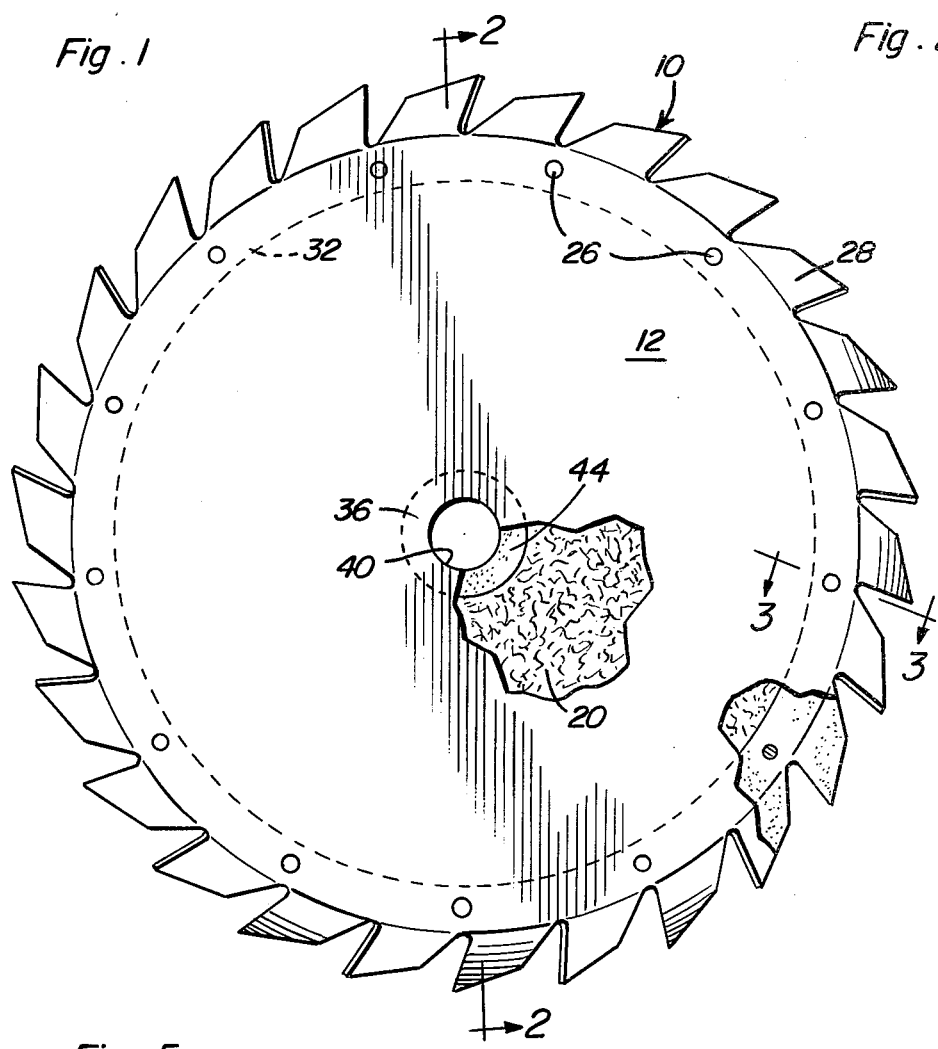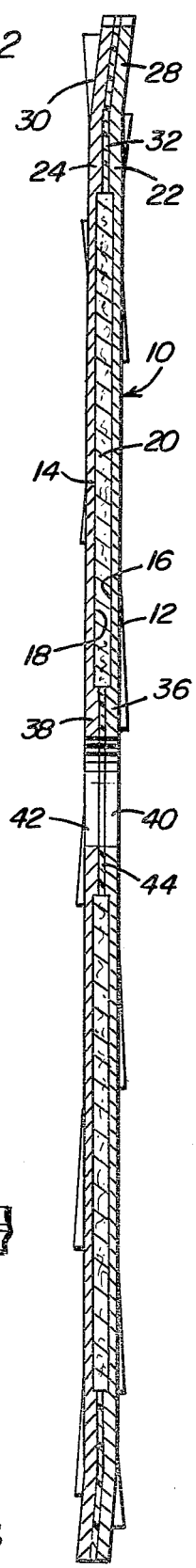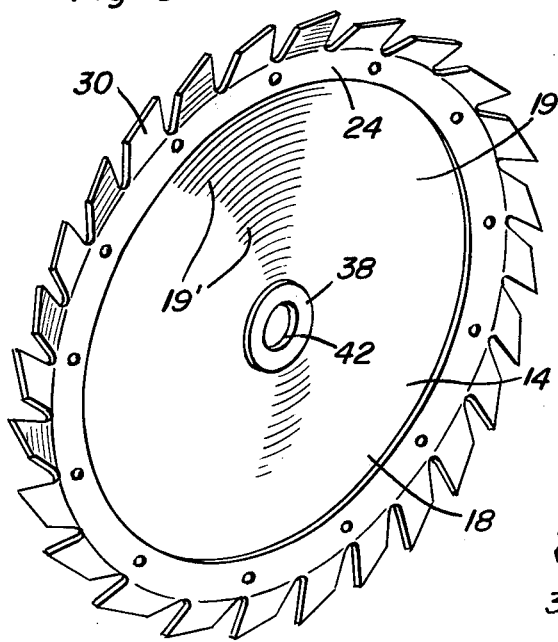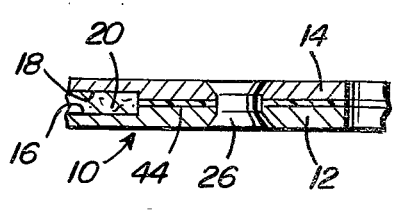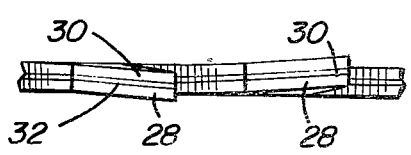

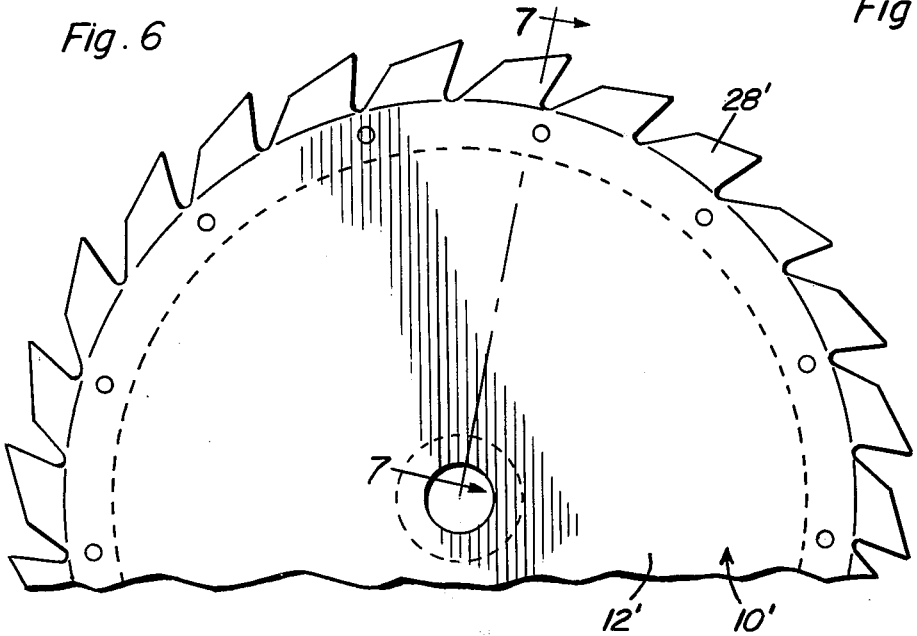
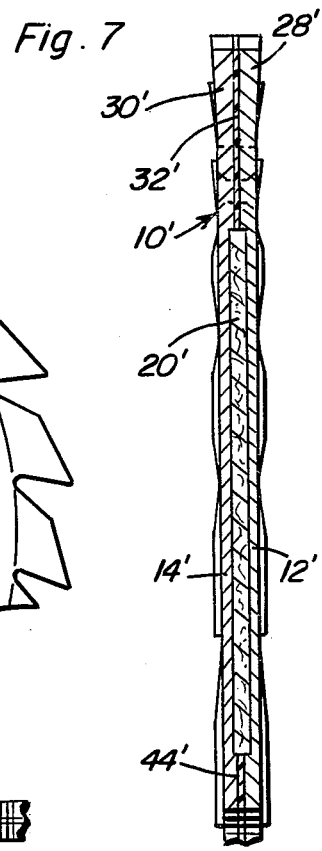
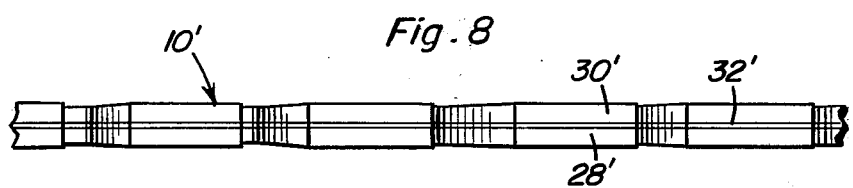
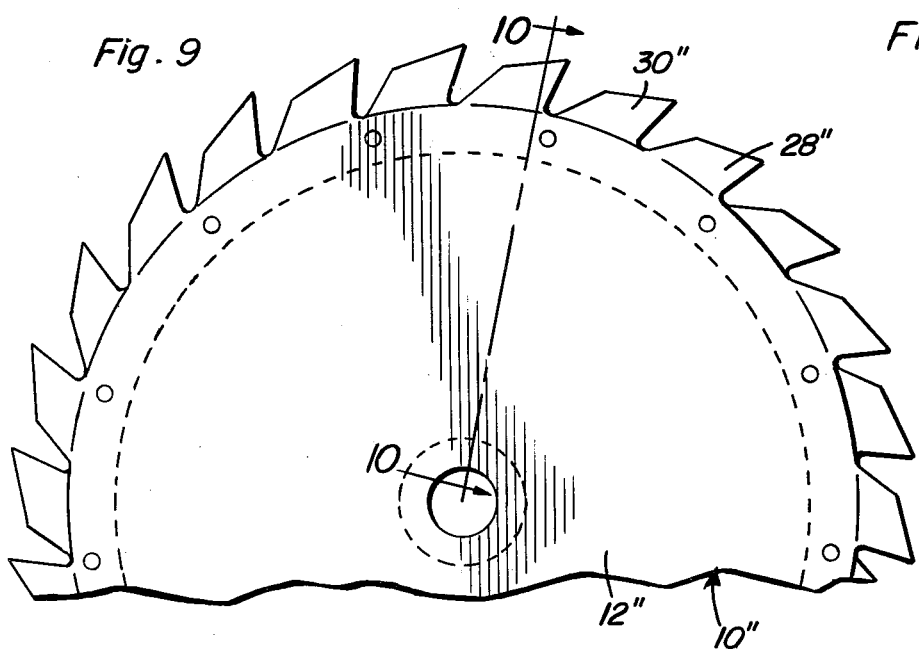
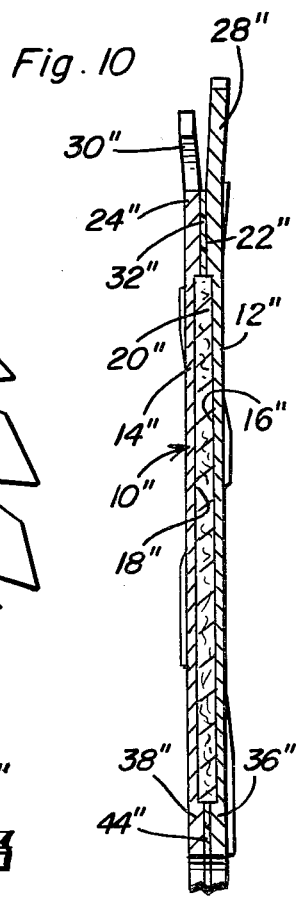
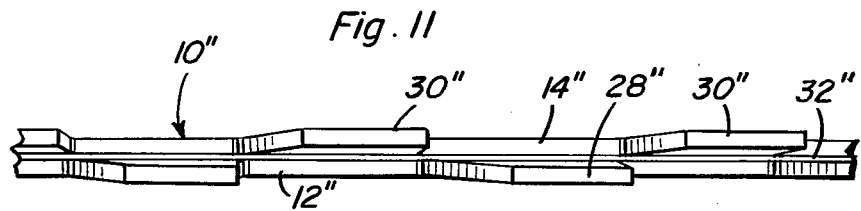

NOISE DAMPENED ROTARY SAW BLADE

BACKGROUND OF THE INVENTION

1. Field of the Invention

Rotary saw blades and particularly rotary saw blades which are spun at high speed during cutting operations vibrate to an extent that considerable noise is generated thereby. Further, the vibration of conventional saw blades consumes considerable energy and, accordingly, more power is required to rotate the saw blade than is required by the cutting action of the saw blade alone.

2. Description of the Prior Art

For these reasons various attempts to provide a noise dampened rotary saw blade have heretofore been made. Examples of various forms of noise dampened rotary blades and other noise dampening structures including some of the basic structural features of the instant invention are disclosed in U.S. Pat. Nos. 1,918,770, 2,683,923, 2,686,439, 2,694,852, 2,791,248, 2,794,485, 3,799,025, 3,812,755 and 3,990,338.

BRIEF DESCRIPTION OF THE INVENTION

The rotary saw blade of the instant invention includes a pair of circular disk panels disposed in side-by-side superposed relation and the panels include shallow concentric and opposing annular recesses therein each of a radial extent greater than one-half the radial extent of the panels and spaced inwardly of the outer marginal portions of the panels. A filler of vibration dampening and absorbing material is disposed in and fills the recesses, independent of compression of the filler within the recesses, and the outer marginal portions of the disk panels are secured together. In addition, a thin layer of hard but slightly deformable material is disposed between the opposing surfaces of the disk panels radially inwardly and radially outwardly of the recesses and this layer prevents positive metal-to-metal contact between the metal disk panels. By this construction, the vibration generated by the rotary disk during a cutting operation is maintained at a minimum and what vibration is generated is effectively dampened by the filler within the recesses formed in the disk panels.

The main object of this invention is to provide a rotary disk for cutting operations and including vibration dampening structure.

Another object of this invention is to provide a rotary disk for use as a rotary saw blade and constructed in a manner whereby vibration of the saw blade during a cutting operation is reduced and what vibration is produced is effectively dampened.

Another important object of this invention is to provide a rotary saw blade in accordance with the preceding objects and constructed in a manner whereby various types of saw teeth may be supported from the outer periphery of the saw blade.

A final object of this invention to be specifically enumerated herein is to provide a vibration damped rotary saw blade which will conform to conventional forms of manufacture, be of simple construction and easy to use so as to provide a device that will economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a first form of rotary saw blade constructed in accordance with the present invention and with portions of the near side of the blade being broken away;

FIG. 2 is an enlarged, vertical, sectional view taken substantially upon the plane indicated by the section line 2—2 of FIG. 1;

FIG. 3 is a fragmentary, enlarged, sectional view taken substantially upon the plane indicated by the section line 3—3 of FIG. 1;

FIG. 4 is an enlarged, fragmentary edge, elevational view of one peripheral portion of the blade illustrated in FIG. 1;

FIG. 5 is a perspective view of one disk panel of the rotary saw blade illustrated in FIGS. 1 through 4;

FIG. 6 is a fragmentary, side, elevational view of a second form of saw blade structured in accordance with the present invention;

FIG. 7 is an enlarged, fragmentary, vertical sectional view taken substantially upon a plane indicated by the section line 7—7 of FIG. 6;

FIG. 8 is a fragmentary, edge, elevational view of one marginal portion of the second form of blade illustrated in FIGS. 6 and 7;

FIG. 9 is a fragmentary, side, elevational view of a third form of rotary saw blade constructed in accordance with the present invention;

FIG. 10 is a fragmentary, enlarged, vertical, sectional view taken substantially upon a plane indicated by the section line 10—10 of FIG. 9; and FIG. 11 is a fragmentary, enlarged, edge, elevational view of one marginal portion of the third form of saw blade illustrated in FIGS. 9 and 10.

DETAILED DESCRIPTION OF THE INVENTION

Referring now more specifically to the drawings, the numeral 10 generally designates a rotary saw blade constructed in accordance with the present invention. The saw blade 10 includes a pair of circular disk panels 12 and 14 disposed in side-by-side superposed relation and the panels 12 and 14 include shallow concentric opposing annular recesses 16 and 18 whose inner surfaces 19 are roughened by concentric circular grooves 19' formed therein. The gooves may be very fine grooves or grooves of greater transverse dimensions, according to the filler material to be disposed in the recesses 16 and 18. Further, means other than grooves 19' may be used to roughen the surfaces 19.

The annular recesses 16 and 18 are each of a radial extent greater than one-half the radial extent of the panels 12 and 14 and a filler 20 of mechanical vibration dampening and absorbing material is disposed in and fills the recesses 16 and 18. The outer marginal portions 22 and 24 of the disk panels 12 and 14 are secured together by circumferentially spaced rivets 26 secured therethrough and it may be seen from FIG. 3 of the drawings that the opposite ends of the rivets 26 are countersunk flush with the remote sides of the disk panels 12 and 14.

The outer marginal portions 22 and 24 of the disk panels 12 and 14 additionally include registered peripherally spaced teeth 28 and 30 with alternate pairs of teeth 28 and 30 laterally offset to opposite sides of the saw blade 10. Further, the opposing surfaces of the outer marginal portions 22 and 24 including the teeth 28 and 30 have a thin layer 32 of Teflon disposed therebetween and the inner marginal portions 36 and 38 of the disk panels 12 and 14 immediately outwardly of the center apertures 40 and 42 formed therein also have a thin layer 44 of Teflon disposed therebetween in order to prevent direct metal-to-metal contact between the disk panels 12 and 14, the latter being constructed of suitable metal.

Referring now more specifically to FIGS. 6, 7 and 8 of the drawings, there will be seen a modified form of saw blade referred to in general by the reference numeral 10'. The saw blades 10' is constructed in a similar manner to the saw blade 10 and the various components thereof corresponding to the aforementioned components of the saw blade 10 are designated by prime reference numerals corresponding to the reference numerals given the various components of the saw blade 10.

The saw blade 10' differs from the saw blade 10 in that the teeth 28' and 30' comprise angular teeth which increase slightly in width toward their outer ends, whereby the teeth 28' and 30' form a kerf of slightly greater width than the thickness of the saw blade 10' radially inwardly of the teeth 28' and 30'. Otherwise, the saw blade 10' is constructed in a similar manner to the saw blade 10.

With reference now more specifically to FIGS. 9, 10 and 11 of the drawings, a third form of saw blade constructed in accordance with the present invention is referred to in general by the reference numeral 10". Here again, the saw blade 10" is constructed in a similar manner to the saw blade 10 and the various components thereof are referred to by double prime numerals corresponding to the numerals identifying the various components of the saw blade 10.

The saw blade 10" differs from the saw blade 10 in that the teeth 28" and 30" thereof are alternately spaced about the periphery of the saw blade 10" and are angulated outwardly of the corresponding sides of the saw blade 10". Otherwise, the saw blade 10" is constructed in a similar manner to the saw blade 10.

The saw blades 10 and 10' may be used efficiently for cutting solid materials and the saw blade 10" may be used efficiently for cutting more porous materials.

It will, of course, be pointed out that the saw blade 10' includes thickness or layers 32' and 44' of Teflon corresponding to the layers 32 and 44. However, inasmuch as the teeth 28" and 30" are spaced alternately about the periphery of the saw blade 10", the layer 32" corresponding to the layer 32 does not extend to the inner sides of the teeth 28" and 30", but is limited to the outer marginal portions 22" and 24" of the disk panels 12" and 14" spaced inwardly of the teeth 28" and 30" and outwardly of the recesses 16" and 18". However, the opposing surfaces of the inner marginal portions 36" and 38" have a thin layer 44" of Teflon disposed therebetween corresponding to the layer 44. Further, the teeth of the panels 12" and 14" about the periphery of the blade 10" permits the construction of a blade of sufficient thickness to include the vibration dampening and absorbing material 20", but including the same cutting surface as a conventional blade of one-half the thickness of blade 10", thereby reducing the sound/vibration generated through the cutting surfaces striking the material being cut.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vibration damped rotary disk, said rotary disk including a pair of circular disk panels disposed in side-by-side superposed relation, said disk panels including shallow concentric and opposing annular recesses therein of a radial extent greater than one-half the radial extent of said panels and spaced inwardly of the outer marginal portions of said panels, a filler of mechanical vibration absorbing material disposed in and filling said recesses, and means securing the outer marginal portions of said disk panels together.

2. The combination of claim 1 including a thin layer of hard but slightly deformable material disposed between the opposing surfaces of said disk panels radially inwardly and radially outwardly of said recesses.

3. The combination of claim 2 wherein said thin layer is constructed of Teflon.

4. The combination of claim 1 wherein said means securing the outer marginal portions of said disk panels together comprises circumferentially spaced rivets secured through said outer marginal portions.

5. The combination of claim 4 including a thin layer of hard but slightly deformable material disposed between the opposing surfaces of said disk panels radially inwardly and radially outwardly of said recesses.

6. The combination of claim 5 wherein said thin layer is constructed of Teflon.

7. The combination of claim 1 wherein the outer marginal portions of said disk panels include radially outwardly projecting teeth spaced thereabout.

8. The combination of claim 7 wherein the teeth on one disk panel lie congruent to corresponding teeth on the other disk panel.

9. The combination of claim 8 wherein said teeth comprise angular teeth and congruent teeth together form a tooth structure diverging outwardly of remote sides of said disk panels.

10. The combination of claim 8 wherein congruent teeth are angulated toward one side of said rotary disk.

11. The combination of claim 7 wherein the teeth on one disk panel are spaced, about the periphery of said rotary disk, intermediate adjacent peripheral teeth of the other disk panel.

12. The combination of claim 1 wherein the surfaces of said disk panels defining the inner remote surfaces of said recesses are generally parallel and roughened for more intimate engagement with and stabilization of said sound deadening material.

* * * * *